United States Patent
Mikalsen et al.

(10) Patent No.: US 6,832,243 B1
(45) Date of Patent: Dec. 14, 2004

(54) METHODS AND APPARATUS FOR DEFINING, OBSERVING AND EVALUATING MESSAGE DELIVERY OUTCOME ON A PER-MESSAGE BASIS

(75) Inventors: Thomas A. Mikalsen, Cold Spring, NY (US); Isabelle M. Rouvellou, New York, NY (US); Stanley M. Sutton, Jr., Chappaqua, NY (US); Stefan C. Tai, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 09/638,762

(22) Filed: Aug. 15, 2000

(51) Int. Cl.[7] .............................................. G06F 13/00
(52) U.S. Cl. ...................... 709/206; 709/224; 719/318
(58) Field of Search ................. 709/206, 207, 709/217, 219, 223, 224, 202, 203, 204, 313, 329; 719/313, 318

(56) References Cited

U.S. PATENT DOCUMENTS

| | | | | |
|---|---|---|---|---|
| 5,379,426 A | | 1/1995 | Foss et al. | |
| 5,966,663 A | * | 10/1999 | Gleason | 455/466 |
| 5,983,265 A | | 11/1999 | Martino, II | |
| 6,163,802 A | * | 12/2000 | Lin et al. | 709/217 |
| 6,259,772 B1 | * | 7/2001 | Stephens et al. | 379/88.23 |
| 6,463,462 B1 | * | 10/2002 | Smith et al. | 709/206 |
| 6,529,932 B1 | * | 3/2003 | Dadiomov et al. | 718/101 |
| 6,584,466 B1 | * | 6/2003 | Serbinis et al. | 707/10 |
| 6,618,749 B1 | * | 9/2003 | Saito et al. | 709/207 |

FOREIGN PATENT DOCUMENTS

EP              0469199 A      2/1992

* cited by examiner

*Primary Examiner*—Viet D. Vu
(74) *Attorney, Agent, or Firm*—Rafael Perez-Pineiro; Ryan, Mason & Lewis, LLP

(57) ABSTRACT

A computer-based method for use in an asynchronous messaging system comprises the steps of: (i) defining at least one message delivery outcome condition for at least one message to be sent in the system and associating the message delivery outcome condition with the message to be sent in the system; (ii) sending the message with the associated message delivery outcome condition in the system; and (iii) monitoring the delivery of the sent message and evaluating the delivery outcome of the message with respect to the associated message delivery outcome condition such that a sender of the message may be notified as to the outcome of the delivery of the message to final recipients.

35 Claims, 8 Drawing Sheets

METHODS AND APPARATUS FOR DEFINING, OBSERVING AND EVALUATING MESSAGE DELIVERY OUTCOME ON A PER-MESSAGE BASIS

FIELD OF THE INVENTION

The present invention relates to distributed and concurrent software systems that use asynchronous messaging and, more particularly, to methods and apparatus for defining and handling message delivery outcomes, e.g., successes and/or failures, on a per-message basis.

BACKGROUND OF THE INVENTION

Distributed and concurrent software systems employ different forms of electronic communication. Messaging is one such communication model. With messaging, the system components communicate with each other by sending messages. A message conveys some application-specific data.

Messaging is inherently asynchronous in that a system component sends a message at one point in time and continues to compute independent of the message delivery and any recipients of the message. The message sender may receive a reply to the message at a later point in time. The sender and the recipients of the message are time-independent, i.e., they need not be available on the network at the same time.

Many distributed and concurrent software systems depend on asynchronous messaging, and use message middleware for this purpose. Message middleware refers to one or more software programs for effecting messaging operations between components of a software system. With message middleware, a message typically is sent to some form of destination, for example, a message queue, from which other clients of the message middleware, e.g., final message recipients, can then read the message. Thus, the sender and the recipients of a message are not necessarily aware of each other's existence.

The failure and respective success of each message delivery is important, possibly even critical, to the sender of the message. The application-specific criteria by which message delivery failure is determined may, in general, differ from sender to sender and message to message. However, specifying these criteria, evaluating the message delivery according to the criteria, and reacting to the outcome of the evaluation is difficult to do and not readily supported by existing message middleware.

Existing message middleware, for example, MQSeries (a trademark of IBM Corporation) or implementations of the Java Message Service JMS (a trademark of Sun Microsystems, Inc.), only support a very limited notion of message delivery failure, and do not differentiate between different failure notions that the sender of a message could otherwise define on a per-message basis. The sender of a message only specifies the destination of the message and may declare the message delivery to be reliable. The message middleware then guarantees the delivery of the message to the destination even in the presence of failures such as system crashes. Existing message middleware does not support the definition of application-specific criteria upon which the failure and respective success of a message delivery can be determined.

SUMMARY OF THE INVENTION

The present invention provides methods and apparatus for defining and handling message delivery outcomes on a per-message basis. It is to be appreciated that the outcome may be considered either "success" or "failure."

In one aspect of the invention, a computer-based method for use in an asynchronous messaging system comprises the steps of: (i) defining at least one message delivery outcome condition for at least one message to be sent in the system and associating the message delivery outcome condition with the message to be sent in the system; (ii) sending the message with the associated message delivery outcome condition in the system; and (iii) monitoring delivery of the sent message and evaluating the delivery outcome of the message with respect to the associated message delivery outcome condition such that a sender of the message may be notified as to the outcome of the delivery of the message to final recipients.

In another aspect of the present invention, an application programming interface is provided to be used by the sender of a message to perform the steps of: (i) specifying message delivery outcome conditions on a per-message basis; (ii) associating messages and (object representations of) message outcome conditions; (iii) sending out messages with these outcome conditions; (iv) querying about the status of message deliveries with respect to their outcome conditions; (v) permitting the modification or replacement of the outcome conditions specified for a message; and (vi) designating an object to receive evaluation outcome notifications.

In yet another aspect of the present invention, computer-based apparatus is provided for performing one or more of the following operations: (i) representing message outcome conditions as persistent objects; (ii) observing message delivery; (iii) evaluating message outcome conditions; (iv) answering queries about the status of message deliveries with respect to their outcome conditions; and (v) notifying the message sender or an object that the sender designates about the evaluation outcome for each message sent. The apparatus may be implemented using existing message middleware adapted to implement the inventive teachings provided herein.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
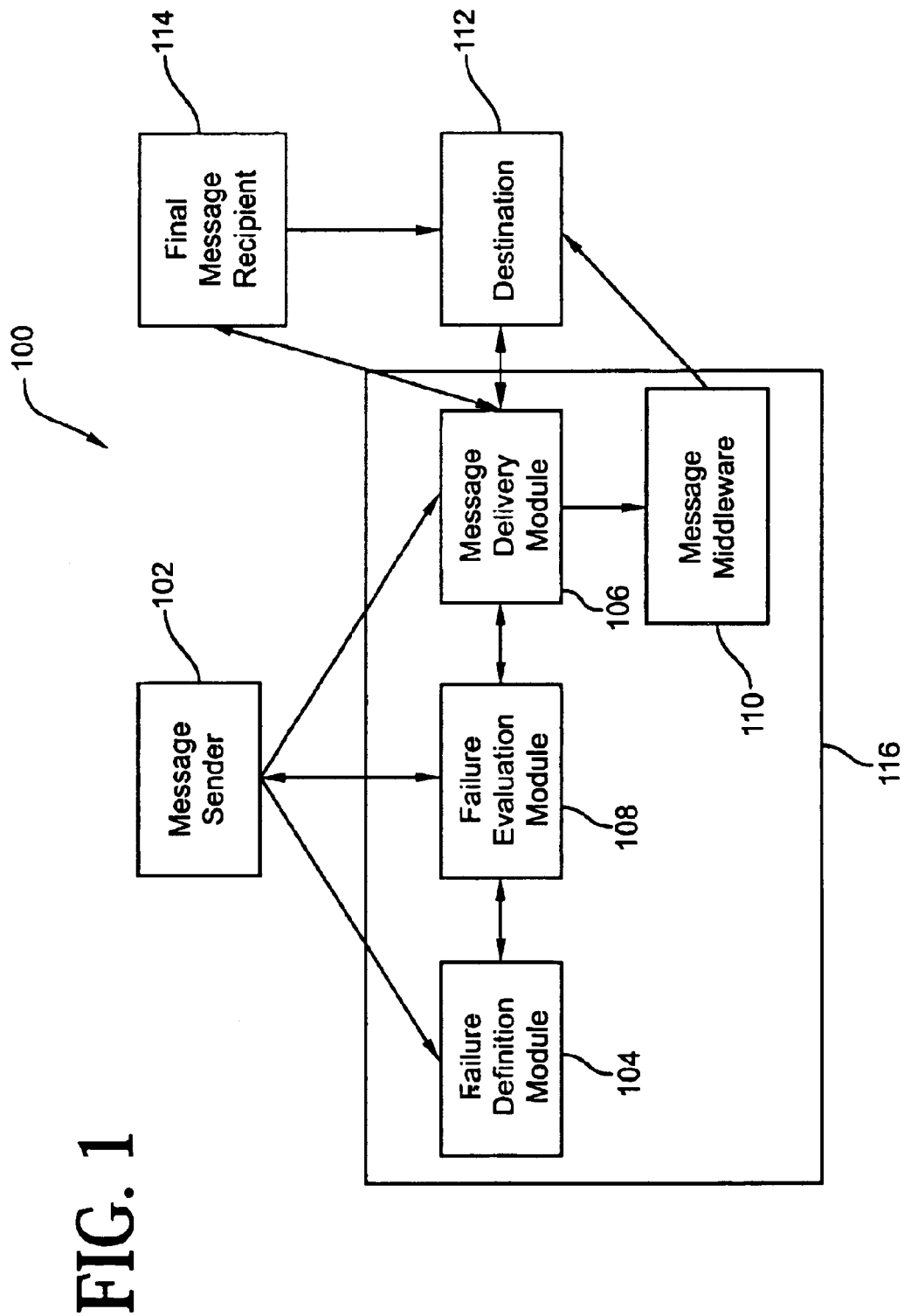
FIG. 1 is a block diagram of a system using messaging in accordance with an embodiment of the present invention.

The present invention will be explained below in the context of an illustrative software system that uses asynchronous messaging. The system is preferably distributed and concurrent. As is known, a distributed software system is a system wherein components of the system may reside on two or more computer systems coupled by a communications network, while a concurrent software system is a system wherein several computational tasks can be processed in parallel, i.e., concurrently. However, it is to be understood that the present invention is not limited to any particular software system architecture. Rather, the invention is more generally applicable to any software system architecture in which it is desirable to define and handle message delivery outcomes (successes and/or failures) on a per-message basis. The illustrative embodiments described below will consider "failure" to be the outcome condition, although the invention is not so limited.

As previously mentioned, asynchronous messaging refers to the exchange of messages between time-independent software processes. Typically, the sender of a message uses message middleware to send a message to some form of destination that is managed by the middleware, for example, a remote message queue. The final recipients of the message are any other clients of the message middleware that read the message from the destination.

Also, as previously mentioned, the failure and respective success of each message delivery is important, possibly even critical, to the sender of the message. The application-specific criteria by which message delivery failure is determined may, in general, differ from sender to sender and message to message. For example, a message m1 may be considered "successfully" delivered if and only if m1 reaches the particular final recipients r1 and r2 in the time window t1 and t2, respectively. Or, another message m2 may be considered "failed" if there are fewer than five different, anonymous final recipients who receive m2 in time window t3.

However, as previously mentioned, specifying such criteria, evaluating the message delivery according to the criteria, and reacting to the outcome of the evaluation is difficult to do and not readily supported by existing message middleware.

Existing message middleware systems only support a very limited notion of message delivery failure, but do not differentiate between different failure notions that the sender of a message can define on a per-message basis. The sender of a message only specifies the destination of the message, for example a message queue. The final recipients of a message typically are not specified. And while message middleware may guarantee reliable delivery of the message to the intermediate destinations, acknowledgment of message receipts by final recipients must be application-coded and are not directly supported by the middleware.

The present invention introduces a more sophisticated level for message delivery failure definition and management. Using the invention, different notions of message delivery failure can easily be programmed, and the burden of managing message delivery failure is shifted from the sender to the middleware. One particular application of the invention is that a sender can define the overall outcome of a group of actions, i.e., messages sent, in terms of the outcomes of the individual actions, where actions may have different failure conditions. A special case of such is a transaction where the success of the transaction depends on the successful delivery of its messages.

As will be explained in detail below, in a preferred aspect of the present invention, an application programming interface is provided to be used by the sender of a message to: (i) specify message delivery failure conditions on a per-message basis; (ii) associate messages and (object representations of) message failure conditions; (iii) send out messages with these failure conditions; (iv) query about the status of message deliveries with respect to their failure conditions; (v) permit modification or replacement of the failure conditions specified for a message; and (vi) designate an object to receive failure evaluation outcome notifications.

Further, as will also be explained in detail below, in another preferred aspect of the present invention, computer-based apparatus is provided for: (i) representing message failure conditions as persistent objects; (ii) observing message delivery; (iii) evaluating message failure conditions; (iv) answering queries about the status of message deliveries with respect to their failure conditions; and (v) notifying the message sender about the evaluation outcome for each message sent. The apparatus may be implemented using existing message middleware adapted to implement the inventive teachings provided herein.

Values to be set on the persistent objects that represent message delivery failure conditions include, for example, lists of mandatory or optional recipients, both destinations (such as message queues) and final recipients (such as other application objects reading messages from destinations), specifications of time-outs and required time windows for message reads by particular or anonymous final recipients, a cardinality specification of a number or range of any final recipients that must receive the message, and other values that are available to the sender or exposed by the message delivery system.

The representations of message failure conditions may be related to each other in various forms. This includes, for example, an ordering in the form of a generalization-specialization hierarchy and tree, or a linked list.

The invention is illustratively described in detail as follows.

Referring initially to FIG. 1, a block diagram illustrates a system using messaging in accordance with an embodiment of the present invention. The system includes a message sender 102, e.g., a client of the message middleware that sends a message. The message sender 102 uses three modules, as shown in block 116. A failure definition module 104 is used to define message delivery failure conditions. A message delivery module 106 is used to send a message with failure conditions. A failure evaluation module 108 is used to query about the status of a message delivery with respect to its failure conditions.

The failure definition module 104 creates and manages representations of failure conditions. These representations are persistent objects that carry values such as those described above.

The message delivery module 106 sends messages with associated failure conditions, and observes the delivery of a message to destinations and to final recipients. This module uses existing message middleware 110, such as MQSeries or implementations of the JMS.

The failure evaluation module 108 evaluates a message delivery as successful or failed based on the actual message delivery, as observed by the message delivery module 106 and in accordance with the failure conditions that are associated with the message. The status of the evaluation can be queried at any time after a message has been sent, and the failure evaluation module 108 notifies the message sender, or an object that the sender designates, about the outcome of the evaluation. An interface as part of the application programming interface (API) is defined by the system for this purpose. This interface is implemented and provided by the message sender (or the designated object) as part of the application.

It is to be appreciated that the term "interface" is used herein as a technical term of software engineering, where an interface groups a set of operations (functions) that some service provider (e.g. an object) offers. An interface thus comprises operation definitions, and is implemented by a software component. The software component may either be a component of the application, or a component of the message delivery system, e.g., as shown in FIG. 1.

Existing message middleware 110 is used for (reliable) message delivery to destinations 112, such as message queues or JMS Topic objects. In order to observe message delivery to final message recipients 114, the final recipients may register with the message delivery module 106 previous to reading messages from destinations 112 and provide an interface that can be used by the message delivery module 106 for observation purposes. This interface is defined by the system as part of the API, and implemented by the application (in this case, the final recipients) for communication purposes with the system. Alternatively, the final recipients 114 may use a specific interface and object for reading messages from destinations, so that the message delivery module 106 can automatically be notified by this object whenever a final recipient reads a message from the destination.

It is to be appreciated that when the software system is distributed, the failure definition module 104, the message delivery module 106, the failure evaluation module 108 and the message middleware 110 may reside on one or more computer systems, while the message sender 102, destination 112 and final message recipients 114 reside on their own separate computer systems. Each of the computer systems may be coupled via a suitable communications network.

Figure 2:
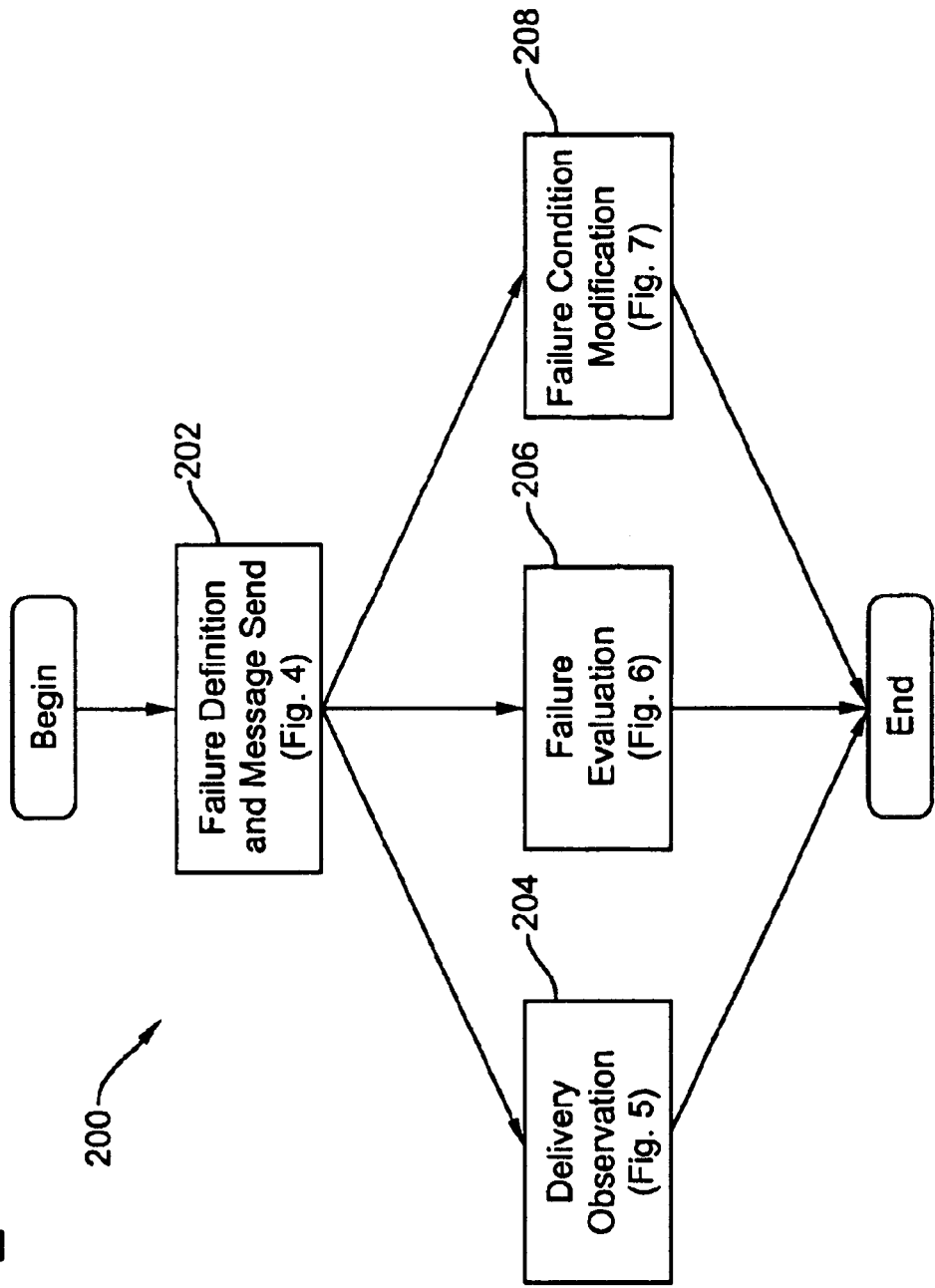
FIG. 2 is a flow diagram of a messaging process in accordance with an embodiment of the present invention relating the flow diagrams of FIG. 4, FIG. 5, FIG. 6 and FIG. 7.
Figure 6:
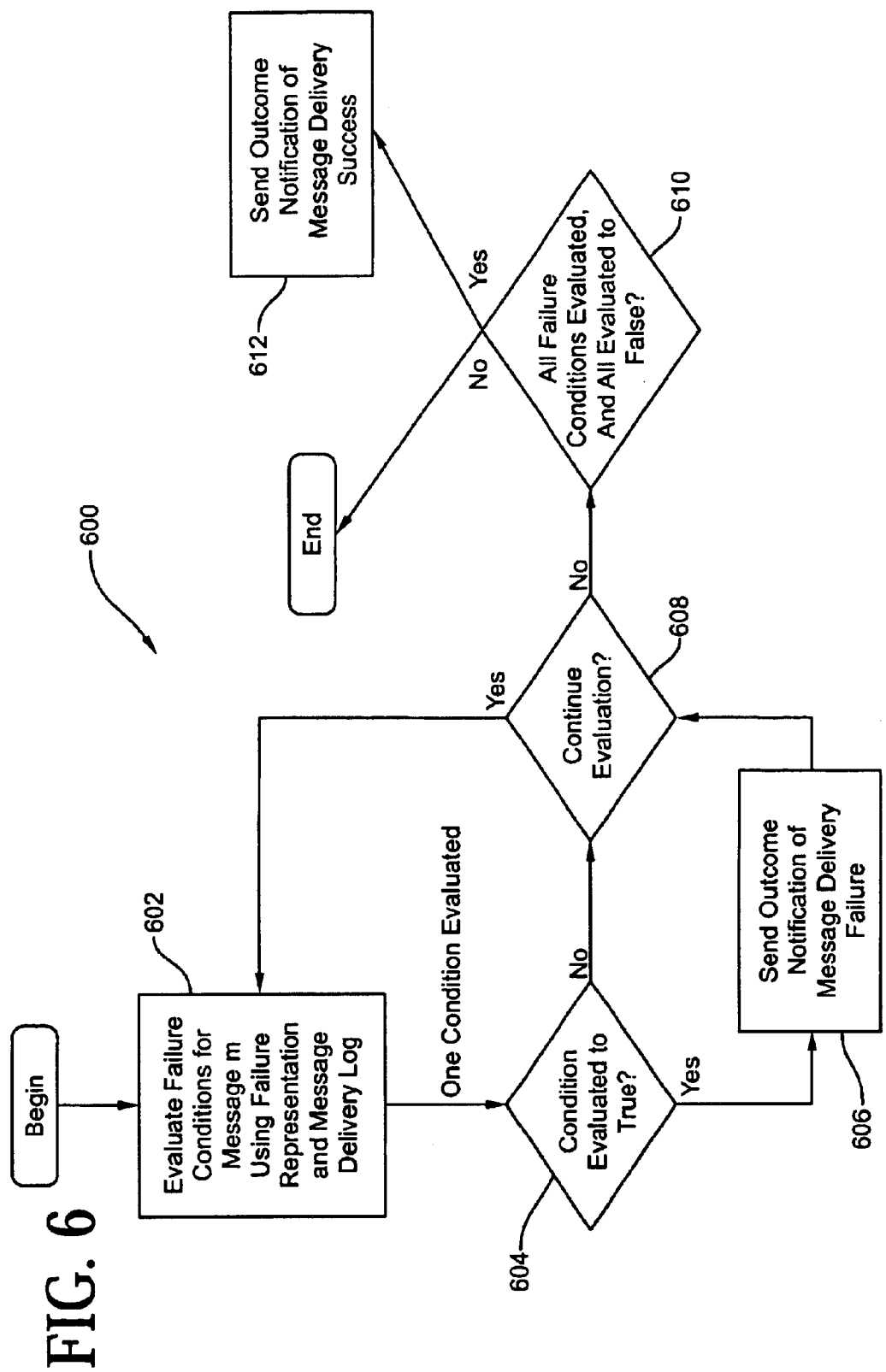
FIG. 6 is a flow diagram of a message failure evaluation process in accordance with an embodiment of the present invention.
Figure 7:
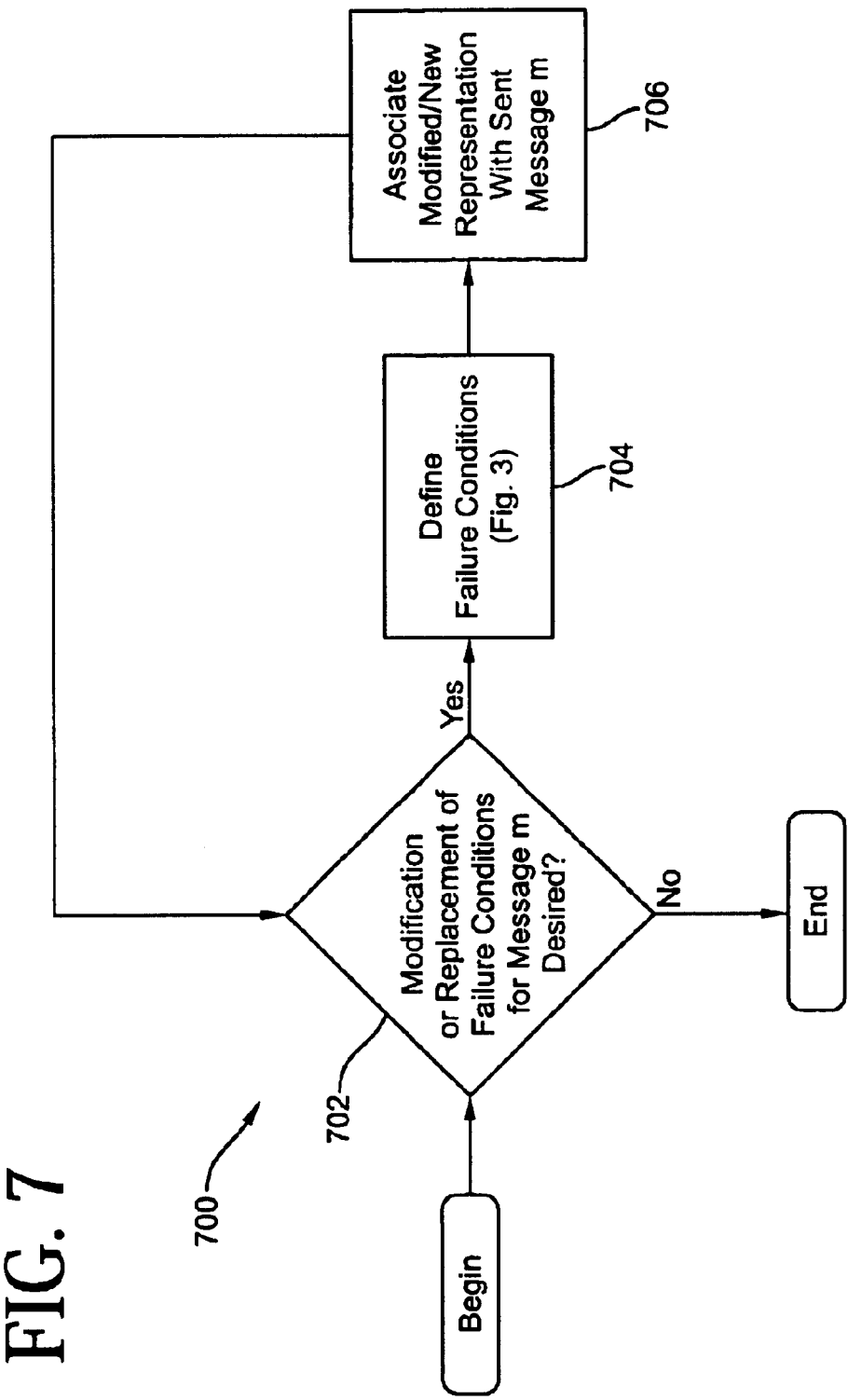
FIG. 7 is a flow diagram of a message failure condition modification process in accordance with an embodiment of the present invention.

Referring now to FIG. 2, a flow diagram is shown depicting a messaging process in accordance with an embodiment of the present invention. Specifically, FIG. 2 relates the steps which are detailed in separate figures, namely, message failure definition and message send (FIG. 4, which in turn refers to FIG. 3), message delivery observation (FIG. 5), message failure evaluation (FIG. 6), and message failure condition modification (FIG. 7).

Figure 4:
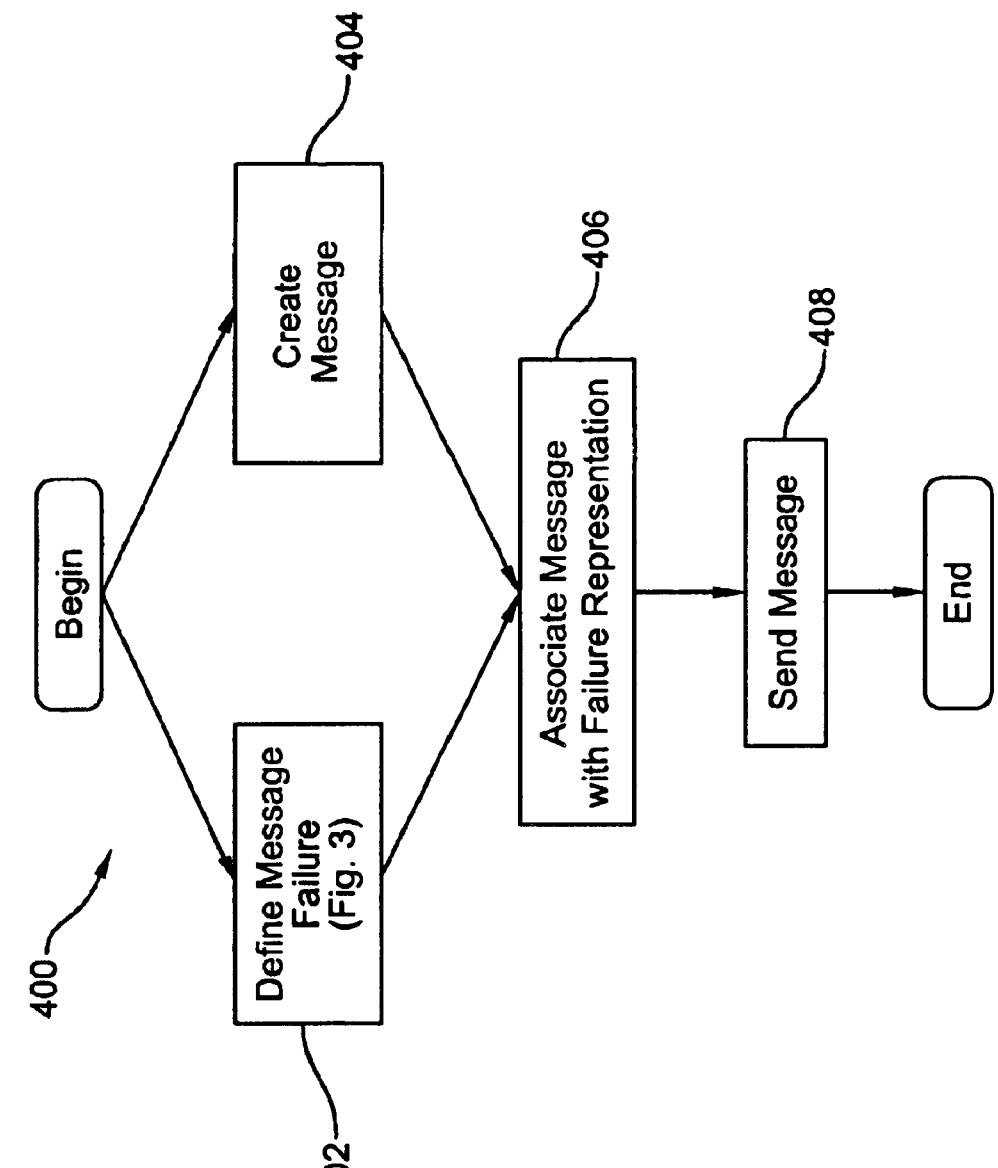
FIG. 4 is a flow diagram of a message send process in accordance with an embodiment of the present invention.

The process 200 begins by sending a message with failure conditions in step 202 (as described in FIG. 4). Once a message is sent, the delivery of the message is observed in step 204 (FIG. 5), and, in parallel, the failure conditions are evaluated in step 206 (FIG. 6). Optionally, the failure conditions for the message may be modified in step 208 (FIG. 7). Delivery observation and failure evaluation may take place concurrently and immediately after a message is sent. Failure conditions may be modified any time after a message is sent, affecting the outcome of the failure evaluation process.

Figure 3:
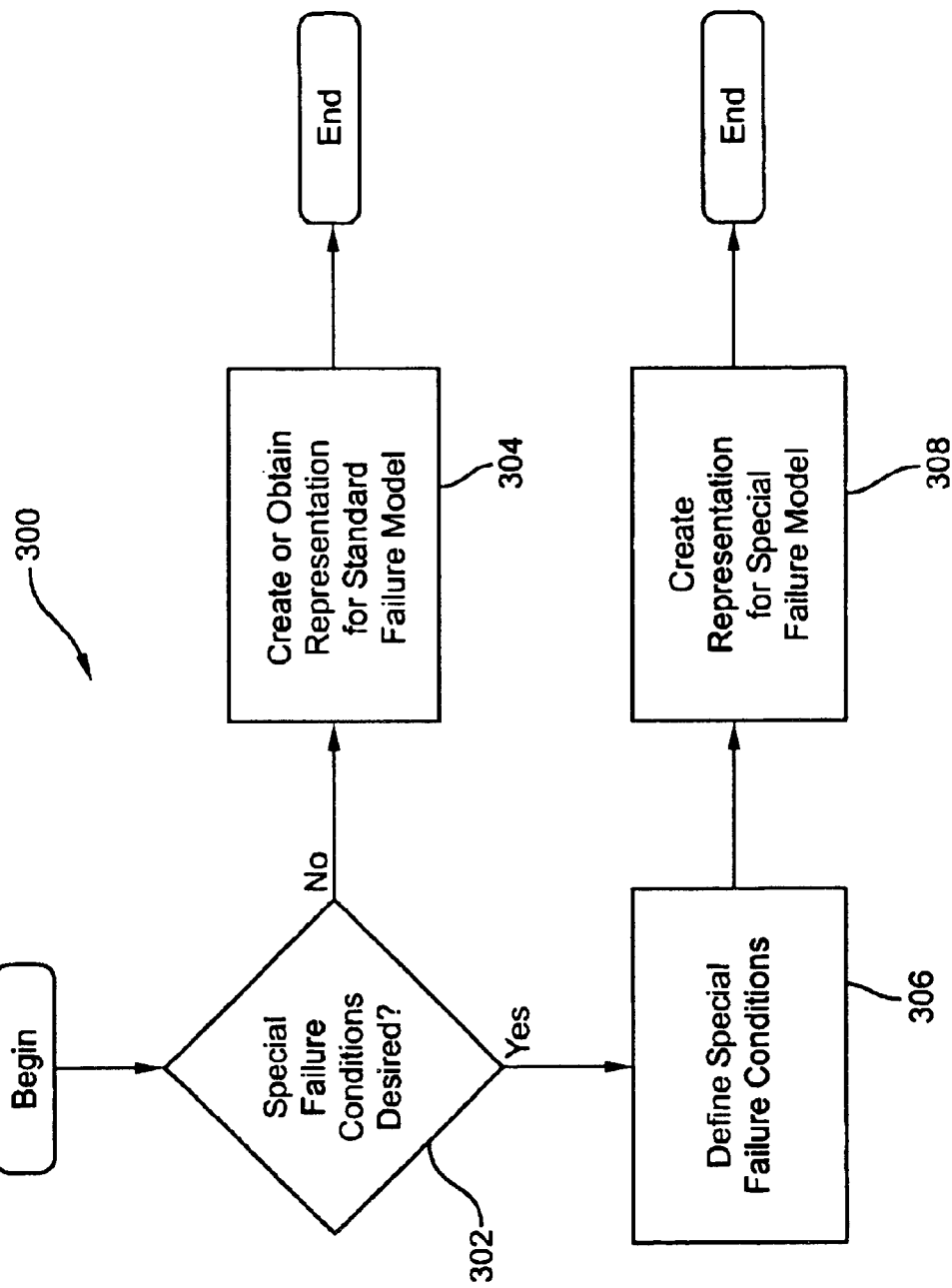
FIG. 3 is a flow diagram of a message failure definition process in accordance with an embodiment of the present invention.

Referring now to FIG. 3, a flow diagram is shown depicting message failure definition in accordance with an embodiment of the present invention. The process 300 begins by determining if special (application-specific) message failure conditions are desired in step 302. If no special failure conditions are desired, a representation for the standard, predefined failure model is created or obtained in step 304 from another object or persistent store, and the process of failure definition ends. If special failure conditions are desired, the failure conditions are defined in step 306 by the message sender using the failure definition module. Once the conditions are defined, a representation for the special failure model is created in step 308, and the process ends. Representations of failure conditions are persistent objects.

Referring now to FIG. 4, a flow diagram illustrates a process of sending messages with failure conditions in accordance with an embodiment of the present invention.

The process 400 begins by defining message failure in step 402 (as described above in the context of FIG. 3), or by creating the message to be sent in step 404. Any order of these two steps is fine, but both need to be completed for the next process step of associating the message with the failure representation in step 406. The message associated with the failure representation can then be sent using the message delivery module in step 408.

Figure 5:
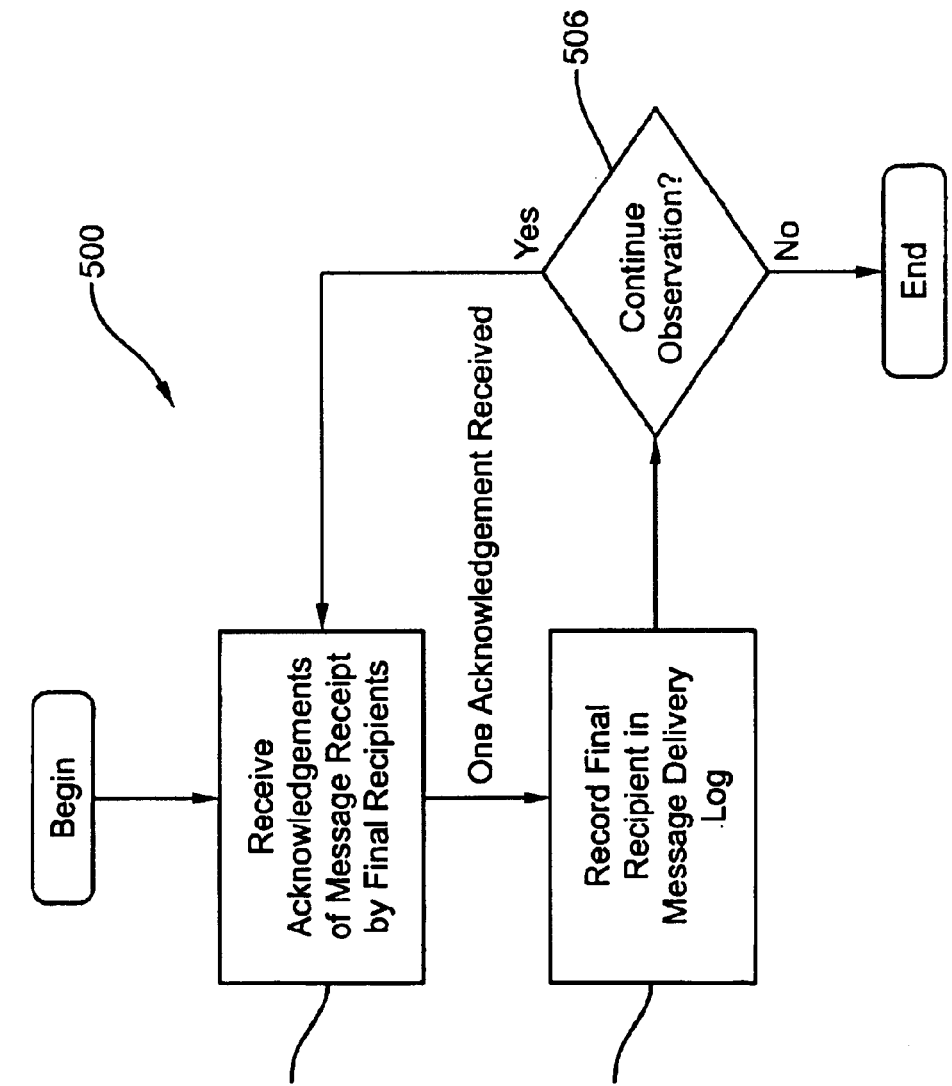
FIG. 5 is a flow diagram of a message delivery observation process in accordance with an embodiment of the present invention.

Referring now to FIG. 5, a flow diagram illustrates message delivery observation in accordance with an embodiment of the present invention.

The process 500 begins as the message delivery module (or, an entity designated by the message delivery module) is waiting to receive acknowledgments of message receipts by final message recipients in step 502. Such acknowledgments may be communicated directly by the final recipient to the message delivery module, or indirectly through the use of a special interface and object that the final recipients use for reading from destinations. In the case of direct communication, the reading of the message and the sending of an acknowledgment receipt to the message delivery module are two separate, distinct actions. In the indirect case, the sending of an acknowledgment is performed implicitly and automatically by the system when the recipients read the message. The recipient uses a specific read-operation provided by the system in this case.

When one acknowledgment is received, the identity of the final recipient is determined and recorded in a message delivery log in step 504. The message delivery log is a persistent record of final message recipients for a message sent. The process then continues by determining whether to continue observation, or not, in step 506. This decision takes external and internal time-outs into consideration. An internal time-out is a time-out, associated to a message, that is specified within the system. An external time-out is an event managed outside the system (perhaps by the application) and not associated to a single message; an external time-out is an external event causing the process to end. If the observation is to continue, the process repeats from the step of receiving acknowledgments, i.e., step 502. If the observation is to stop, the process ends.

Referring now to FIG. 6, a flow diagram is shown depicting a process of message failure evaluation in accordance with an embodiment of the present invention.

The process 600 begins as all non-evaluated failure conditions for a sent message m are to be evaluated using the failure representation (as described above in the context of FIG. 3) and the message delivery log (as described above in the context of FIG. 5) in step 602. A condition can be evaluated to true or false once the criteria to determine evaluation is available; for example, a time-out occurs, or an acknowledgment of a message read by a final message recipient is entered into the message delivery log. Such events, as well as other events, may trigger the evaluation of a condition.

As soon as one condition is evaluated, the process continues to check if the particular failure condition evaluated to true in step 604. A failure condition evaluating to true implies that the message delivery failed. If yes, an outcome notification of message delivery failure is sent by the failure evaluation module to the message sender, or the object designated by the message sender for receiving outcome notifications, in step 606.

After an outcome notification of message delivery failure is sent, or, if the condition evaluated to false, the process continues by determining whether to continue the evaluation, or to stop the evaluation, in step 608. This decision takes external and internal time-outs into consideration, as explained above. If the evaluation is to continue, the process repeats from the step of evaluating all non-evaluated failure conditions for the message m, i.e., step 602.

If the decision is to stop the failure evaluation, the process determines whether all failure conditions have been evaluated, and whether all conditions evaluated to false, in step 610. If this is the case, an outcome notification of message delivery success is sent to the message sender, or the designated notification object, in step 612. Otherwise, and in case a notification of message delivery success has been sent, the process ends.

The failure evaluation module 108 (FIG. 1) provides an interface that a message sender can use at any time to query about the status of the evaluation, e.g., which conditions have been evaluated so far, or how many acknowledgments of receipts have been received from final recipients.

Referring now to FIG. 7, a flow diagram illustrates a process of modifying and/or replacing the failure conditions for a sent message in accordance with an embodiment of the present invention.

The process 700 begins by determining whether failure condition modification, i.e., respective replacement, is desired, or not, in step 702. This decision may be made by the message sender. In case that it is desired to modify the conditions, the failure conditions are defined in step 704 according to the process described above in the context of FIG. 3, and the resulting modified or new failure representation is then associated with the sent message in step 706. The process continues by returning back to the initial decision state of failure condition modification, i.e., step 702. If a decision for no modification is made, the process ends.

The above detailed explanation describes a preferred way of practicing the invention. One skilled in the art will realize several variations on the invention given the teachings provided herein.

By way of example, the three modules of failure definition, failure evaluation, and message delivery (FIG. 1) may be implemented as a single module, or may be split into even more separate modules (for example, a separate message delivery observation module).

In addition to, or in replacement of, message failure conditions, message success conditions may be specified. Message success conditions can be defined in terms of failure, i.e., be mapped to corresponding failure conditions, so that a preferred way of implementing the present invention, as described, is applicable to success conditions in all aspects.

Further variations may include the variable order of message failure definition and message creation prior to message sends, different ways of observing message reads by final recipients, and different ways of notifying the message sender about the evaluation outcome for a message.

Figure 8:
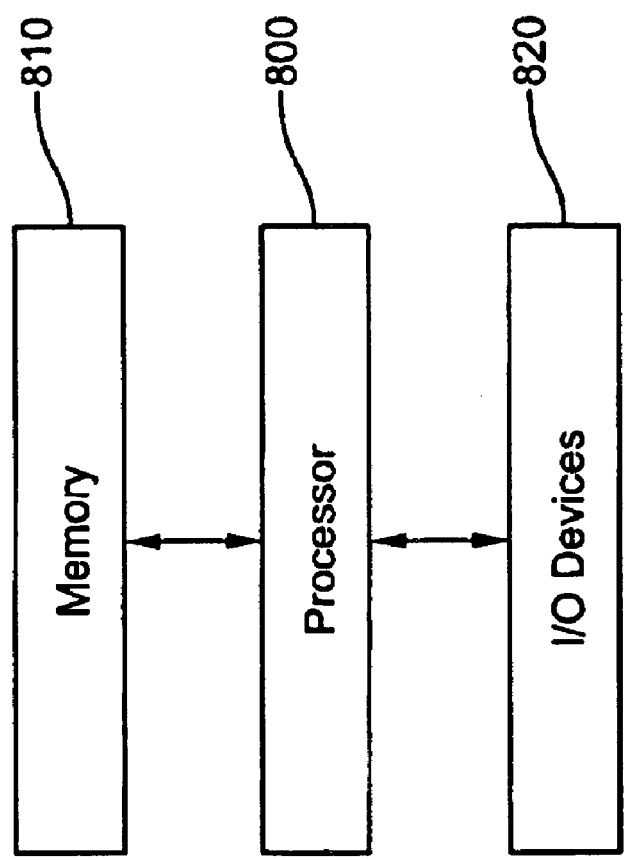
FIG. 8 is a block diagram illustrating a generalized hardware architecture of a computer system suitable for implementing a messaging system according to the present invention.

Referring now to FIG. 8, a block diagram is shown illustrating a generalized hardware architecture of a computer system suitable for implementing one or more of the various functional components/modules of a system employing messaging processes as depicted in the figures and explained in detail herein. It is to be understood that the individual components of the messaging system, for example, as illustrated and described in the context of FIG. 1, may be implemented on one such computer system, or on more than one separate such computer systems.

As shown, the computer system may be implemented in accordance with a processor 800, a memory 810 and 110 devices 820. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

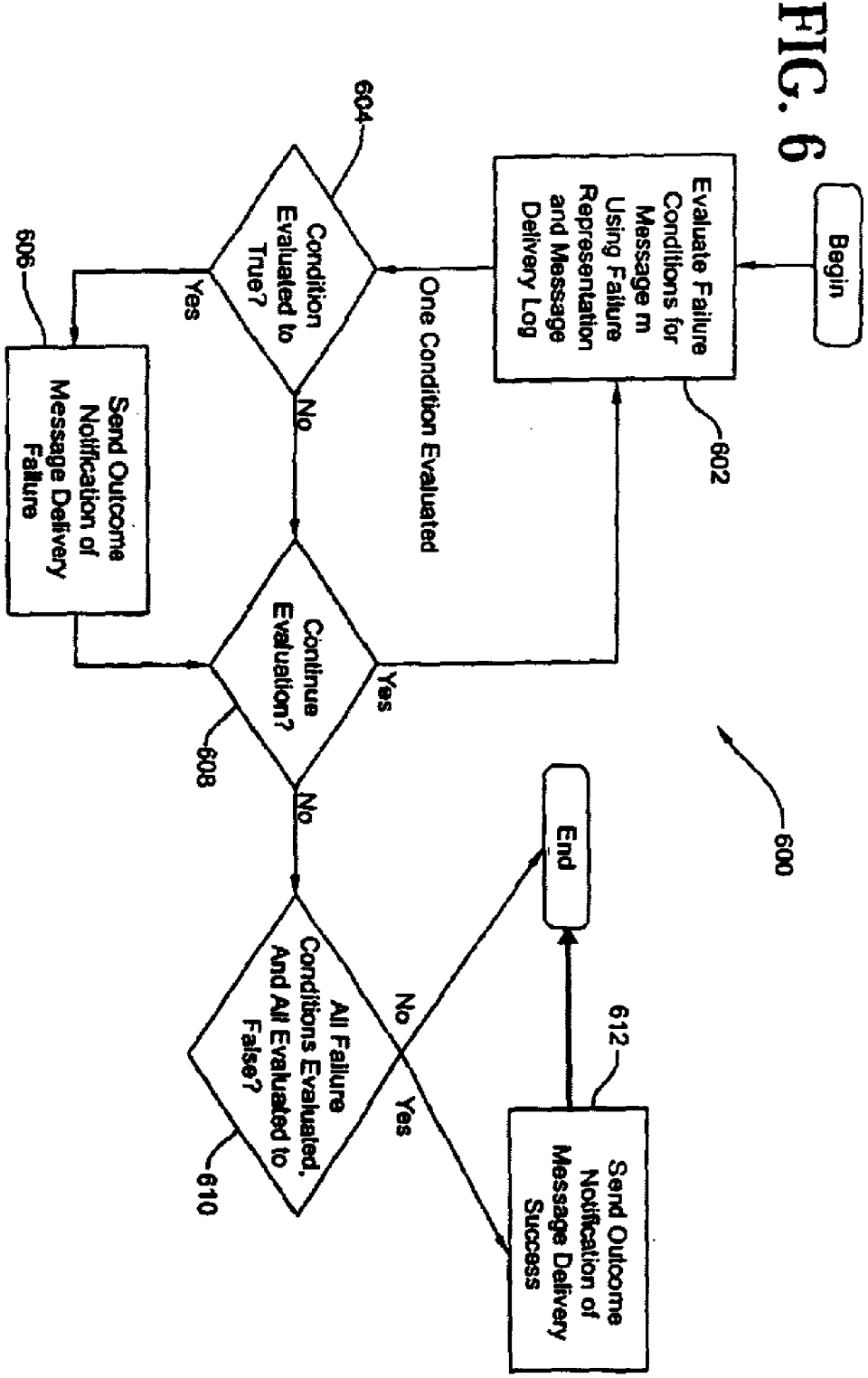

What is claimed is:

1. A computer-based method for use in an asynchronous messaging system, the method comprising the steps of:

defining at least one message delivery outcome condition for at least one message to be sent in the system and associating the message delivery outcome condition with the message to be sent in the system, wherein the delivery outcome condition is representable as an object separable from the message and further wherein the delivery outcome is capable of being conditioned on one or more actions of one or more recipients of the message;

sending the message with the associated message delivery outcome condition in the system; and monitoring delivery of the sent message and evaluating the delivery outcome of the message with respect to the associated message delivery outcome condition such that a sender of the message may be notified as to the delivery outcome of the message.

2. The method of claim 1, wherein the message delivery outcome is one of success and failure.

3. The method of claim 1, wherein the message outcome definition step is performed independent of a particular message.

4. The method of claim 1, wherein the message outcome definition step represents message outcome conditions as persistent objects.

5. The method of claim 4, wherein a particular message outcome representation is a set of related objects.

6. The method of claim 1, wherein the message that is to be sent is associated with a representation of message outcome conditions in the form of one or more persistent objects.

7. The method of claim 6, wherein a particular representation of message outcome conditions is associated with a set of different messages.

8. The method of claim 1, in which the message delivery monitoring step is performed in accordance with at least one of one or more destinations and one or more final message recipients.

9. The method of claim 1, wherein the message delivery monitoring step comprises the step of recording message receipts in a persistent message delivery log.

10. The method of claim 1, wherein the message outcome evaluation step is performed by using outcome representation objects and message delivery logs in which message receipts are recorded.

11. The method of claim 1, wherein a status of the message outcome evaluation step is queried by the message sender.

12. The method of claim 1, wherein the delivery outcome is sent to the message sender.

13. The method of claim 1, wherein the delivery outcome is sent to an object that the message sender designates for receiving outcome notifications.

14. The method of claim 1, wherein at least one of the message delivery outcome monitoring step and evaluating step has a time-out associated therewith.

15. The method of claim 1, further comprising the step of modifying one or more message outcome conditions that are associated with a message after the message has been sent out.

16. The method of claim 1, further comprising the step of replacing one or more message outcome conditions that are associated with a message after the message has been sent out.

17. Apparatus for use in an asynchronous messaging system, the apparatus comprising:
one or more processors operative to: (i) define at least one message delivery outcome condition for at least one message to be sent in the system and associate the message delivery outcome condition with the message to be sent in the system, wherein the delivery outcome condition is representable as an object separable from the message and further wherein the delivery outcome is capable of being conditioned on one or more actions of one or more recipients of the message; (ii) send the message with the associated message delivery outcome condition in the system; and (iii) monitor delivery of the sent message and evaluate the delivery outcome of the message with respect to the associated message delivery outcome condition such that a sender of the message may be notified as to the delivery outcome of the message.

18. The apparatus of claim 17, wherein the message delivery outcome is one of success and failure.

19. The apparatus of claim 17, wherein the message outcome definition operation is performed independent of a particular message.

20. The apparatus of claim 17, wherein the message outcome definition operation represents message outcome conditions as persistent objects.

21. The apparatus of claim 20, wherein a particular message outcome representation is a set of related objects.

22. The apparatus of claim 17, wherein the message that is to be sent is associated with a representation of message outcome conditions in the form of one or more persistent objects.

23. The apparatus of claim 22, wherein a particular representation of message outcome conditions is associated with a set of different messages.

24. The apparatus of claim 17, in which the message delivery monitoring operation is performed in accordance with at least one of one or more destinations and one or more final message recipients.

25. The apparatus of claim 17, wherein the message delivery monitoring operation comprises recording message receipts in a persistent message delivery log.

26. The apparatus of claim 17, wherein the message outcome evaluation operation is performed by using outcome representation objects and message delivery logs in which message receipts are recorded.

27. The apparatus of claim 17, wherein a status of the message outcome evaluation operation is queried by the message sender.

28. The apparatus of claim 17, wherein the delivery outcome is sent to the message sender.

29. The apparatus of claim 17, wherein the delivery outcome is sent to an object that the message sender designates for receiving outcome notifications.

30. The apparatus of claim 17, wherein at least one of the message delivery outcome monitoring operation and evaluating operation has a time-out associated therewith.

31. The apparatus of claim 17, wherein the one or more processors are further operative to modify one or more message outcome conditions that are associated with a message after the message has been sent out.

32. The apparatus of claim 17, wherein the one or more processors are further operative to replace one or more message outcome conditions that are associated with a message after the message has been sent out.

33. An article of manufacture for use in an asynchronous messaging system, comprising a machine readable medium containing one or more programs which when executed implement the steps of:
defining at least one message delivery outcome condition for at least one message to be sent in the system and associating the message delivery outcome condition with the message to be sent in the system, wherein the delivery outcome condition is representable as an object separable from the message and further wherein the delivery outcome is capable of being conditioned on one or more actions of one or more recipients of the message;
sending the message with the associated message delivery outcome condition in the system; and
monitoring delivery of the sent message and evaluating the delivery outcome of the message with respect to the associated message delivery outcome condition such that a sender of the message may be notified as to the delivery outcome of the message.

34. An application programming interface associated with an asynchronous messaging system, the interface comprising software code which when executed permits the implementation of the steps of:
specifying message delivery outcome conditions on a per-message basis, wherein at least one of the message delivery a outcome conditions is representable as an object separable from a message and further wherein the delivery outcome is capable of being conditioned on one or more actions of one or more recipients of the message;

associating messages and message outcome conditions;

sending out messages with the associated outcome conditions;

querying about the status of message deliveries with respect to their outcome conditions;

permitting at least one of modification and replacement of the outcome conditions specified for a message; and designating an object to receive evaluation outcome notifications.

35. Apparatus for use in an asynchronous messaging system, the apparatus comprising:

one or more processors operative to: (i) represent message outcome conditions as persistent objects, wherein at least one of the persistent objects is separable from a message and further wherein a message outcome is capable of being conditioned on one or more actions of one or more recipients of the message; (ii) observe message delivery; (iii) evaluate message outcome conditions; (iv) answer queries about the status of message deliveries with respect to their outcome conditions; and (v) notify a message sender or an object that the sender designates about the evaluation outcome for each message sent.

* * * * *

UNITED STATES PATENT AND TRADEMARK OFFICE
CERTIFICATE OF CORRECTION

PATENT NO. : 6,832,243 B1
DATED : December 14, 2004
INVENTOR(S) : T.A. Mikalsen et al.

It is certified that error appears in the above-identified patent and that said Letters Patent is hereby corrected as shown below:

Title page,
Item [56], References Cited, OTHER PUBLICATIONS, add the following:
-- D. Newman, "Deliver By SMTP Service Extension," Sun Microsystems, Network Working Group, Standards Track, pp. 1-13, June 2000. --

Drawings,
Please replace Fig. 6 with the Fig. 6 shown in the attached sheet.

Signed and Sealed this

Twenty-ninth Day of March, 2005

JON W. DUDAS
*Director of the United States Patent and Trademark Office*